Patented Nov. 8, 1938

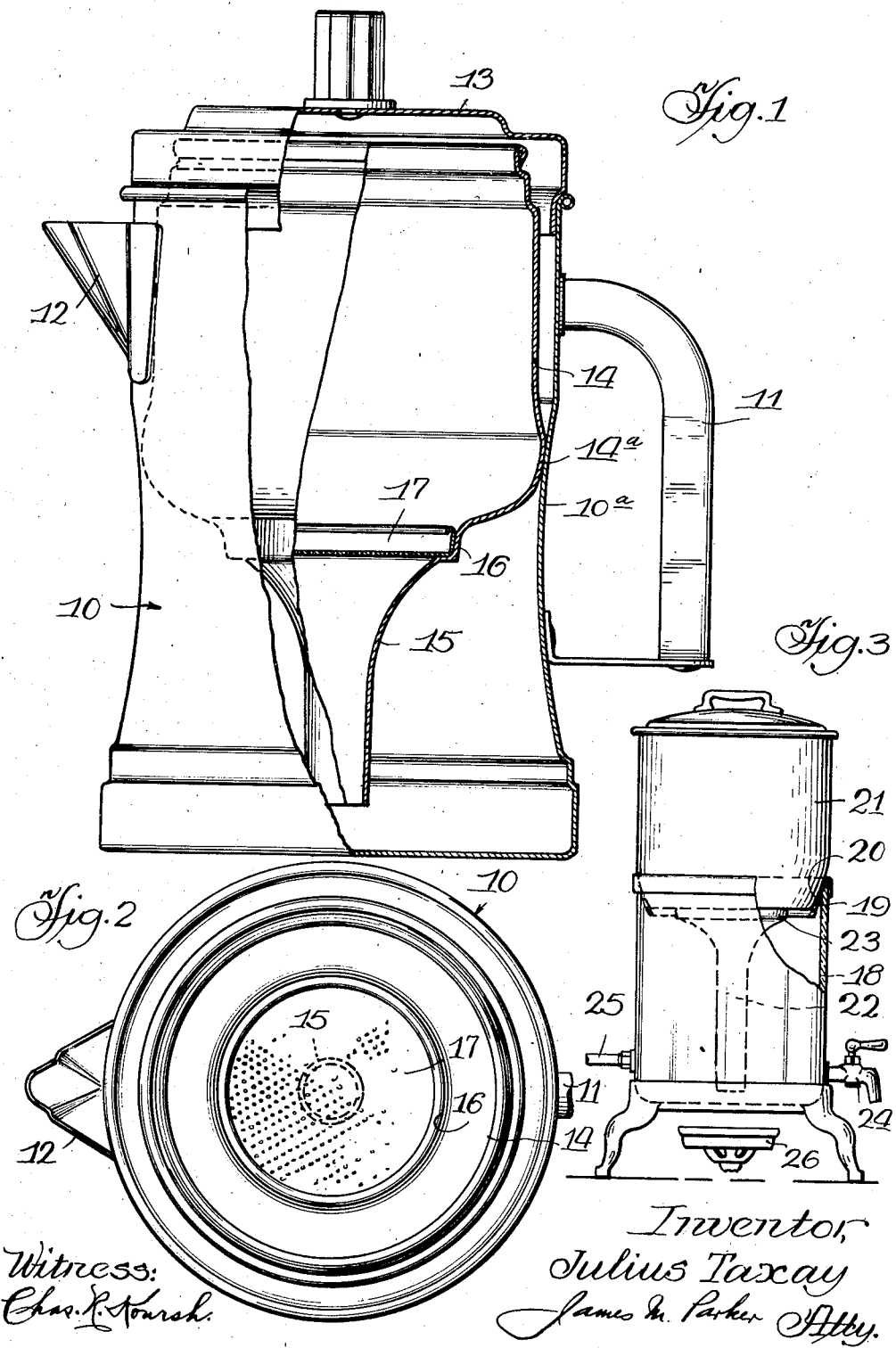

2,135,543

UNITED STATES PATENT OFFICE 2,135,543

COFFEE BREWER

Julius Taxay, Chicago, Ill., assignor, by direct and mesne assignments, of one-half to James M. Parker, Chicago, Ill., and one-half to Miracle Household Appliance Corporation, Chicago, Ill., a corporation of Illinois Application January 20, 1936, Serial No. 59,853

5 Claims. (Cl. 53—3)

This invention relates to improvements in coffee brewers.

One object of the invention is to provide a coffee brewer which operates on the vacuum principle but which is of a form which renders it more convenient in use than the conventional two piece glass coffee brewers of the "Silex" type and which enables the lower or outer receptacle to be readily cleaned or scoured.

Another object of the invention is to provide a coffee brewer which comprises an outer receptacle, the wall of which has an annular and preferably slightly radially expansible portion so shaped as to provide a stable support for and seal with the body portion of a removable inner receptable in which the ground coffee is placed and into which water from the outer receptacle is raised by vapor pressure to form a brew which is drawn back into the outer receptacle when the brewer is removed from the source of heat.

Another object of the invention is to provide a coffee brewer comprising an outer water-holding receptacle and an inner coffee holding receptacle telescopically receivable within the other and each having a sealing surface on the body portion thereof which cooperate when the receptacles are in operative position to provide a sealed pressure chamber in the outer receptacle beneath the lower receptacle, the arrangement being such that the seal can readily be broken and the receptacles easily separated.

Other objects relate to various features of construction and arrangement of parts which will be apparent from a consideration of the following specification and accompanying drawing, wherein:

Figure 1 is a broken side elevation illustrating a coffee brewer embodying the present invention.

Figure 2 is a top plan view of the brewer with the cover removed.

Figure 3 is a broken side elevation of a modified form of the invention which is adapted for commercial use as in restaurants or other commercial establishments.

In the drawing 10 is an outer receptacle which in the form illustrated resembles an ordinary domestic coffee pot or percolator and is provided with a handle 11, pouring spout 12 and cover 13. An inner receptacle 14 is shown of substantially cylindrical form within the receptacle 10, and is provided with a funnel 15 which depends into the lower portion of member 10 but terminates above the bottom thereof. The upper end of the funnel is enlarged to provide an annular seat 16 for a removable filter or strainer 17 which is shown as of cup shape with a foraminous bottom.

The lower portion of the body of the receptacle 14 is provided with an annular bulge or enlargement 14a which is preferably convex in vertical section and arranged to seat frictionally within an annular portion 10a of the member 10 which converges or tapers inwardly and downwardly whereby when the member 14 has been pressed into the outer receptacle to the position illustrated, an air tight seal is provided between the receptacles. Where the receptacle 10 is formed of metal, the downward movement of the portion 14a toward sealing position effects a radial outward wedging effect on the thin wall portion 10a which tends to slightly expand the latter and provide an airtight connection between the sealing portions and retains the inner receptacle in the proper position.

It will be noted that the wall of the receptacle 14 above the annular bulge or band 14a is spaced from the adjacent wall of member 10 whereby a slight tilting or cocking of the member 14 out of the coaxial position shown will break the seal between the portions 10a and 14a and enable the member 14 to be lifted freely out of member 10.

In use, the desired quantity of water is placed in the receptacle 10, member 14 is pressed into the position illustrated and ground coffee placed in the latter, the filter 17 being in position. The cover 13, if desired, may be placed in position since the flange 13a thereof seats within the upper end of receptacle 10 and exteriorly of the upper end of receptacle 14.

The brewer is placed over the source of heat and as the water approaches the boiling point the vapor is entrapped within the pressure chamber formed in the lower portion of member 10 due to the sealing contact of portions 10a and 14a. The developed pressure forces the water up through the funnel 15, and through the filter or strainer 17 until the lower end of the funnel is uncovered by the descending level of the water in the member 10. The brewer can then be removed from the source of heat or the latter turned off, and due to the partial vacuum created within the pressure chamber due to the cessation of the application of heat, the coffee brew is drawn downwardly through the filter into the receptacle 10. The inner receptacle can then be released from engagement with the outer member by tilting or cocking the upper end slightly as above mentioned and removed together with the coffee grounds, and the clear coffee brew served from the outer receptacle.

It has been found that metal coffee brewers made in accordance with the above disclosures provide the necessary air tight seal between the inner and outer receptacles but it will be seen that the receptacles may be made of glass, porcelain or like materials if desired and a cushioning and sealing gasket of rubber, fabric or the like employed to provide the required seal, if desired.

In Figure 3 a form of the invention is disclosed which is adapted for use in restaurants or like establishments where larger quantities of coffee are to be made. In the figure 18 is a lower or outer receptacle which may be made of oven or "pyrex" glass, if desired.

A sealing member 19, preferably of flexible metal, is provided at the upper end of the receptacle 18 and engages a complementary shaped portion 20 of an upper or inner bowl or receptacle 21 to provide an air tight connection therebetween. The inner receptacle has a funnel 22 which depends into the pressure chamber and preferably is so shaped at the upper end as to provide a seat 23 for a filter as described above. The principle of operation of this form of the invention is the same as in the previously described modification.

The receptacle 18 is shown as provided with spiggot 24 for drawing off the coffee brew and a water intake 25 for supplying water prior to the beginning of each brewing operation. The source of heat may be a conventional burner 26.

While the present improvements operate on the well known vacuum principle, it will be seen that the provision of cooperating sealing portions on the bodies of the bowls or receptacles, as distinguished from the conventional glass coffee brewers wherein the seal is effected between a gasket on the funnel of the upper bowl and the interior of the constricted neck of the lower bowl, provide a support for the upper bowl of relatively large diameter, which resists tilting of the inner receptacle with respect to the outer and breaking the seal therebetween. It will also be observed that the sealing portions being preferably of downwardly diminishing diameters enables the inner receptacle of the first described modification of the invention to be pressed directly downwardly into sealing position without turning or rotating the same and that in the commercial form shown in Figure 3, the weight of the receptacle 21 is generally sufficient to provide the necessary air tight seal.

It will also be seen that upon removal of the inner or upper receptacle, the interior of the lower or outer receptacle is readily accessible for cleansing or scouring due to the relatively large diameter of the same throughout its length as compared with the constricted neck of a lower bowl of conventional glass vacuum coffee brewers.

While I have shown and described certain embodiments of the invention for the purpose of illustration, I do not wish to be restricted specifically thereto except as so limited by the appended claims.

I claim:

1. A coffee brewer comprising an outer water-holding receptacle having a downwardly tapered annular sealing surface therein, and an inner coffee holding receptacle arranged to telescope bodily within said outer receptacle and provided with a downwardly extending funnel, said inner receptacle having an annular sealing portion adjacent the base thereof and above said funnel arranged to seat frictionally within a relatively narrow annular portion of said sealing surface to form an air tight connection therewith, the portion of said inner receptacle above said sealing portion being spaced from the adjacent walls of said outer receptacle to enable the inner receptacle to be tilted merely sidewise within said outer receptacle to break the seal and release the inner receptacle from engagement with the outer receptacle.

2. A vacuum coffee brewer comprising an outer receptacle having an inwardly and downwardly tapered expansible wall portion, an inner receptacle comprising a coffee holding body and a downwardly depending funnel adapted to extend into the lower portion of said outer receptacle, and an annular formation on the body of said inner receptacle adapted to be pressed into frictional contact with said tapered expansible wall section to provide an air tight connection therewith.

3. A vacuum type coffee brewer comprising an outer receptacle the interior of which comprises a pressure chamber in the lower portion, an inner receptacle holding chamber at the upper portion, and a downwardly tapered wall common to said chambers, and an inner receptacle having a depending funnel at the lower end adapted to project into said pressure chamber and provided with an annular sealing area above said funnel having an outer surface convex in vertical section adapted to seat within and form a seal with said tapered wall of said outer receptacle, said receptacles being spaced apart above said sealing surfaces to provide an annular space to accommodate radial tilting of the inner receptacle within the outer receptacle to break the seal and release the inner receptacle to enable the same to be removed freely from the outer receptacle.

4. A vacuum type coffee brewer comprising inner and outer receptacles, the outer receptacle having an inwardly off-set annular downwardly tapered wall portion constituting a sealing area intermediate the ends of said receptacle, said inner receptacle being insertable within said outer receptacle and having a bottom provided with a depending funnel and a shoulder outwardly convex in vertical section adjacent the lower end thereof adapted to engage and frictionally seat within said sealing area of the outer receptacle to provide a relatively narrow annular seal therebetween, the upper portion of said inner receptacle above said seal being spaced from the surrounding wall of the outer receptacle whereby said seal can be broken and the inner receptacle released by tilting the same laterally within said outer receptacle.

5. A vacuum type coffee brewer comprising inner and outer receptacles, the outer receptacle having an inwardly offset annular downwardly tapered wall portion constituting a sealing area intermediate the ends of said receptacle, said inner receptacle being insertable within said outer receptacle and having a bottom provided with a depending funnel and a shoulder outwardly convex in vertical section adjacent the lower end thereof adapted to engage and frictionally seat within said sealing area of the outer receptacle to provide a relatively narrow annular seal therebetween, the upper portion of said inner receptacle above said seal being spaced from the surrounding wall of the outer receptacle whereby said seal may be broken by tilting the inner receptacle laterally within said outer receptacle.

JULIUS TAXAY.